United States Patent [19]

Meisel et al.

[11] Patent Number: 5,638,205

[45] Date of Patent: Jun. 10, 1997

[54] LAYER SYSTEM WITH A CONTROLLABLE HEAT EMISSION

[75] Inventors: Thomas Meisel, Bermatingen; Ruediger Braun, Friedrichshafen; Walter Rothmund, Friedrichshafen; Walter Schwarzott, Friedrichshafen; Werner Scherber, Bermatingen; Albert Braig, Markdorf, all of Germany

[73] Assignee: Dornier GmbH, Friedrichshafen, Germany

[21] Appl. No.: 406,150

[22] Filed: Mar. 20, 1995

[30] Foreign Application Priority Data

Mar. 19, 1994 [DE] Germany ............... 44 09 470.1

[51] Int. Cl.$^6$ ............... G02B 5/23; G02F 1/15; G02F 1/153; F21V 9/04
[52] U.S. Cl. ............ 359/350; 359/265; 359/271; 359/360
[58] Field of Search .................. 359/265, 271, 359/275, 350, 359, 360

[56] References Cited

U.S. PATENT DOCUMENTS

| | | | |
|---|---|---|---|
| 4,338,000 | 7/1982 | Kamimori et al. | 359/275 |
| 4,465,339 | 8/1984 | Baucke et al. | 359/275 |
| 4,618,218 | 10/1986 | Shaw et al. | |
| 5,161,048 | 11/1992 | Rukavina | 359/275 |
| 5,293,546 | 3/1994 | Tadros et al. | 359/269 |

FOREIGN PATENT DOCUMENTS

| | | |
|---|---|---|
| 0 272 428 | 6/1988 | European Pat. Off. . |
| 36 43 691 | 3/1992 | Germany . |
| 36 43 692 | 3/1992 | Germany . |
| 589 861 | 7/1977 | Switzerland . |

*Primary Examiner*—Paul M. Dzierzynski
*Assistant Examiner*—Audrey Chang
*Attorney, Agent, or Firm*—Evenson, McKeown, Edwards & Lenahan, P.L.L.C.

[57] ABSTRACT

A layer system with a controllable heat emission, includes an IR-transparent carrier substrate, a layer with a controllable IR-transmission, an ion-permeable, IR-reflecting electrode, a solid electrolyte, an ion storage layer, a back electrode. The ion-permeable, IR-reflecting electrode is structured in such a manner that it is provided with non-cohesive openings which are distributed homogeneously over the electrode surface and whose maximal flat dimension is smaller than 10 μm.

11 Claims, 2 Drawing Sheets

LAYER SYSTEM WITH A CONTROLLABLE HEAT EMISSION

BACKGROUND AND SUMMARY OF THE INVENTION

This invention relates to a layer system having a controllable heat emission.

The heat balance of a spacecraft is essentially determined by the interplay of three effects: 1) radiation from the outside, predominantly from the sun and the earth; 2) internal heat sources, such as electric equipment; and 3) heat radiation into space.

Layer systems with a controllable heat emission, in the following also called electroemissive elements, permit the control of radiation-caused heat flows with a low expenditure of energy and without any mechanical functions. A known state of the art electroemissive element shown in FIG. 1 consists of a multilayer system on an infrared-transparent carrier substrate 1. The layer system 2, 3, 4, 5, 6 comprises at least one electroemissive layer 2, an ion-permeable and infrared-reflecting electrode 3, an infrared-absorbing solid electrolyte 4, an ion storage layer 5 and a back electrode 6.

The function of the component is based on the electrically controlled change of the infrared (IR)-transmission of the electroemissive layer in front of an "infrared mirror." The surface of the component is the side of the substrate which is illustrated to be uncoated in FIG. 1. From there, heat radiation passes through the IR-transparent substrate largely in an unhindered manner. When the electroemissive layer 2 is transmissive, this heat radiation is reflected by the electrode situated behind it. In this case, the element itself can emit little heat. When, in contrast, the electroemissive layer is switched to be absorptive, a reflection of the heat radiation, which impinges from the outside, on the electrode 3 is no longer possible. The electroemissive layer 2 will now emit the heat radiation corresponding to its temperature. Only by means of the arrangement of the electrode 3 between the electroemissive coating 2 and the IR-absorbing solid electrolyte 4, is it possible to make the IR-effect visible.

The function of the electroemissive (EE)-element and the object of the electrode 3 will be explained in detail by way of an example, in which tungsten oxide is used as the electroemissive layer 2.

The infrared-optical switching operation is caused in the electroemissive layer through use of an electrochemical process. While receiving electrons and a simultaneous storing of ions from an electrolyte, a negative potential on the electrode 3 results in the reduction of the electroemissive layer 2. Inversely, while electrons and ions are emitted, an oxidation process takes place on the back electrode 6 or the ion storage layer 5. The electronically insulating solid electrolyte 4 takes over the necessary ion transport between the ion storage layer 5, through openings of the electrode 3, to the electroemissive layer 2. The electric field between the two electrodes 3 and 6 is the driving force for the operation. The reduced electroemissive layer 2 is IR-absorptive and therefore high-emitting.

When a positive potential is applied to the electrode 3, the reverse process will take place. The electroemissive layer 2 is oxidized while emitting electrons and ions and the storage layer is reduced at the same time. The electroemissive layer 2 becomes transmissive.

From German Patent documents DE 36 43 691 and DE 36 43 692, electro-optical components are known. Through the application of an electric voltage, these components have a degree of heat emission which can be switched to a high-emitting condition or, by a pole inversion, can be switched into a low-emitting condition. These components are predominantly suitable for military applications for camouflaging and for civil applications, for example, as a variable thermal control layer for spacecraft and satellites. These systems have the disadvantage that the ion transparency of the electrode 3 is essentially dissolved by the diffusion of a soluble species, such as protons ($H^+$), in precious metal layers (palladium, gold) and/or by the microporosity of thin gold layers on a rough base (in the present case, the electroemissive layer 2). The driving force of the diffusion by the electrode 3 is the concentration gradient, which occurs according to the poling, between the electroemissive layer 2 and the solid electrolyte 4. The concentration gradient is created by the enhancement or depletion of ions of the solid electrolyte when the electric field is applied in the close surroundings of the electrode 3. The voltage of clearly above 1 volt required for the control, in the case of aqueous electrolytes (such as aqueous polymer solid electrolytes with lithium conducting salt), results in undesirable secondary reactions on the electrode 3 (for example, hydrogen development), whereby the useful life of the component is limited to less than 100 switching cycles. Lower voltages in the range of from 0.7 to 1 volt permit only a low emission stroke of below 25% ($\Delta e_{type}$=0.4 ... 0.65), and switching times of approximately 15 minutes at 22° C.

There is therefore needed an improved arrangement and structuring of the known layer systems with a controllable heat emission which meets all of the following requirements:

1) no impairment of the function of the electrode 3; that is, high electronic conductivity over the entire surface;
2) high permeability for ions; that is, no significant resistance against ion flow;
3) optimal contact between solid electrolyte 4 and electroemissive layer 2; and
4) optimal reflectivity of the electrode 3 in the wavelength range>2.5 µm in the direction of the electroemissive layer 2.

These needs are met according to the present invention by providing a layer system with a controllable heat emission. The layer system includes an IR-transparent carrier substrate, a layer with a controllable IR-transmission, an ion-permeable, IR-reflecting electrode, a solid electrolyte, an ion storage layer, and a back electrode. The ion-permeable, IR-reflecting electrode is structured in such a manner that it is provided with non-cohesive openings which are distributed homogeneously over the electrode surface and whose maximal flat dimension is smaller than 10 µm.

The solution according to the present invention relates particularly to the ion-permeable, IR-reflecting electrode. According to the invention, this electrode is structured in such a manner that it is provided with non-cohesive openings which are distributed homogeneously over the electrode surface and whose maximal plane dimension is smaller than 10 µm. The structuring takes place in such a manner that an ion transport is permitted between the electroemissive layer and the solid electrolyte and, at the same time, a high reflectivity is achieved for the radiation of the wavelengths>2.5 µm.

Advantageously, the structuring of the electrode is carried out according to microstructuring methods which are known per se and which are used, for example, for the structuring of semiconductor components.

With respect to the dimensions of the openings in the ion-permeable, IR-reflecting electrode, the following interrelationships apply: Advantageously, the dimensions of the openings should be smaller than the wavelengths of the radiation to be reflected. Since, in practical applications, naturally, there is never a sharply defined wavelength range of the incident radiation, it is sufficient in practice for the dimensions of the openings to be smaller than those wavelengths which together make up a significant portion of the overall intensity of the incident IR-radiation to be reflected.

As a rule, the incident wavelength distribution corresponds to the radiation of a black body. In the case of a suitable dimensioning of the openings in the range of less than or equal to 10 µm, it is possible to achieve a sufficient reflectivity of the electrode for IR-radiation over a large range of application temperatures.

The lower limit of the diameters for the openings is essentially determined by the microstructuring methods possible today.

Suitable materials for the ion-permeable, infrared-reflecting electrode are all conductive materials, such as metals and semiconductors with a high reflectivity for infrared radiation (particularly>2.5 µm). Examples in this respect are particularly metals, such as Au, Ag, Pt, Pd, Al, Cu, Fe, Pb, Ni, Cr, and mixtures thereof, and semiconductors, such as appropriately doped Si, Ge as well as indium oxide, tin oxide, zinc oxide and mixtures thereof. In a particularly advantageous embodiment, the electrode consists of a triple layer of Ti/Au/Ti. The two Ti-layers serve as an adhesive base for the respective adjoining layers (electroemissive layer, solid electrolyte).

The layer thickness of the ion-permeable, infrared-reflecting electrode is preferably in the range of from approximately 0.1 µm to 1 µm. Such layers have the advantage of increased mechanical stability and increased electronic conductivity. In contrast, porous electrodes, as known, for example, according to German Patent document DE 36 43 691 C1, are much thinner (approximately 0.01 µm). There, the transport of the ions through the electrode takes place mainly through the pores of the electrode. For ensuring a sufficient porosity, these electrodes must be correspondingly thin, with the resulting negative consequences for the conductivity and the mechanical stability.

Other objects, advantages and novel features of the present invention will become apparent from the following detailed description of the invention when considered in conjunction with the accompanying drawings.

DETAILED DESCRIPTION OF THE DRAWINGS

Figure 2:
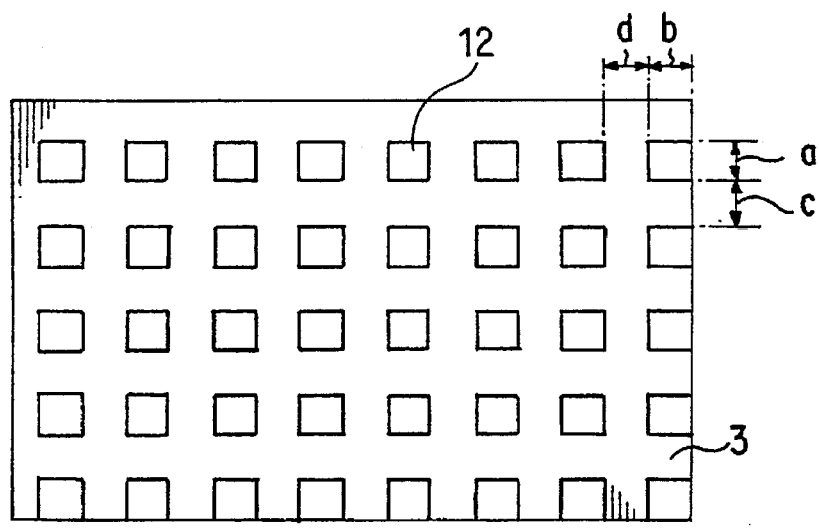
FIG. 2 is an embodiment of the ion-permeable, IR-reflecting electrode of a layer system according to the present invention.
Figure 3:
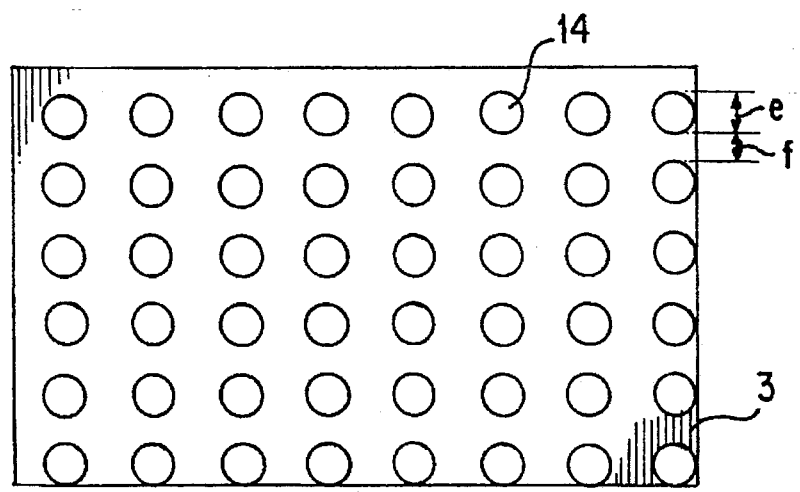
FIG. 3 is another embodiment of the ion-permeable, IR-reflecting electrode of a layer system according to the present invention.

Two possible embodiments of the structuring of the ion-permeable, infrared-reflecting electrode are illustrated in FIGS. 2 and 3. These embodiments are obtained by using microstructuring methods which are known per se. The square 12 or circular 1 openings are homogeneously distributed over the electrode surface. This may be achieved, for example, in that—as illustrated in FIGS. 2 and 3—the distances between the openings are selected to be identical within narrow tolerances (typically +/−10%). The openings are designed such that an opening-to-surface ratio is reached which is as high as possible (for example FIG. 2: (a×b)/((a+c)×(b+d)) without any impairment of the reflectivity in the infrared range (λ>2.5 µm). This requirement can be met if the dimensions of the openings a, b and e are situated as far as possible below the shortest relevant light wave length.

Furthermore, the structuring must be carried out such that the structured electrode continues to remain electronically conductive over the entire electrode surface. For example, openings in the manner of an elongated slot along approximately the whole electrode surface must be avoided.

Through the openings, the charge carriers can diffuse unhindered from the electrolyte into the electroemissive layer. In order to ensure a sufficient ion transport through the electrode, the total surface of the openings must amount to at least 5% of the electrode surface. Advantageously, the openings may be filled with an ion-conducting material.

Electroemissive elements comprising this ion-permeable, infrared-reflecting electrode achieve a controllability of the emission capacity of above 40% and switching times of less than 10 minutes at 22° C.

Higher control voltages (>1.4 V) are possible while the useful life of the electroemissive elements is increased at the same time by at least two magnitudes and the switching time is clearly shortened.

Example for Producing the Ion-Permeable Infrared-Reflecting Electrode

The electrode of the electroemissive element to be structured consists of a triple layer of Ti/Au/Ti. All three layers are electron-beam vaporized and have a thickness of 10/120/20 nm, respectively. The structuring of the 3 µm openings is carried out by the conventional methods of photolithography. Subsequently, the upper Ti-layer is selectively etched off by means of an etching solution of 10 ml HF (30%), 40 ml HNO$_3$ (65%) and 200 ml H$_2$O. Together with the photosensitive resist, the thus structured Ti-layer will now be used as a mask during the etching of the Au-layer. The Au is also etched selectively by means of a solution of 1 g CrO$_3$ to 100 ml HCl (32%). As the last step, the Ti of the bottom layer is removed in the openings of the Au and the photosensitive resist is washed off in acetone. The implementation of the process permits a very good imaging authenticity of the coating mask without the undercuts which are otherwise hard to avoid.

In the following, the achievable reflection values for different ion-permeable, infrared-reflecting embodiments are illustrated by means of examples.

EXAMPLE 1

Square openings (FIG. 2) a×a (a=b) with an edge length of 3 µm and a distance (c, d) of 3 µm in a gold layer of a thickness of 200 nm result in a reflectivity for the ion-permeable, infrared-reflecting electrode of approximately 77% in the case of a wavelength of λ=10 µm of the radiation to be reflected.

EXAMPLE 2

Square openings (FIG. 2) a×a (a=b) with an edge length of 3 µm and a distance (c, d) of 10 µm in a gold layer of a thickness of 200 nm result in a reflectivity for the ion-permeable, infrared-reflecting electrode 3 of approximately 95% at λ=10 μm.

EXAMPLE 3

Round openings (FIG. 3) with a diameter e of 3 μm and a distance f of 3 μm in a gold layer of a thickness of 200 nm result in a reflectivity for the ion-permeable, infrared-reflecting electrode 3 of approximately 80% at λ=10 μm.

EXAMPLE 4

Round openings (FIG. 3) with a diameter e of 3 μm and a distance f of 10 μm in a gold layer of a thickness of 200 nm result in a reflectivity for the ion-permeable, infrared-reflecting electrode 3 of approximately 95% at λ=10 μm.

In order to further promote the movement of ions from the solid electrolyte into the electroemissive layer, an additional IR-transparent electrode may advantageously be provided between the IR-transparent carrier substrate 1 and the electroemissive layer 2.

Figure 1:
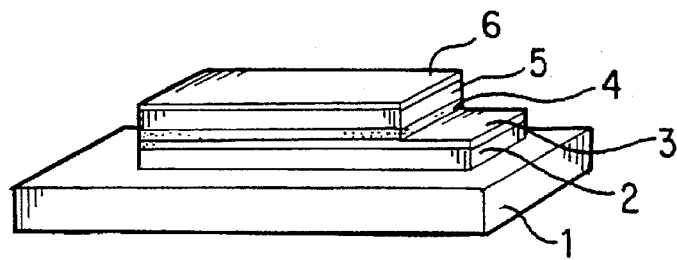
FIG. 1 is a perspective view of the basic construction of a layer system with a controllable heat emission.
Figure 4:
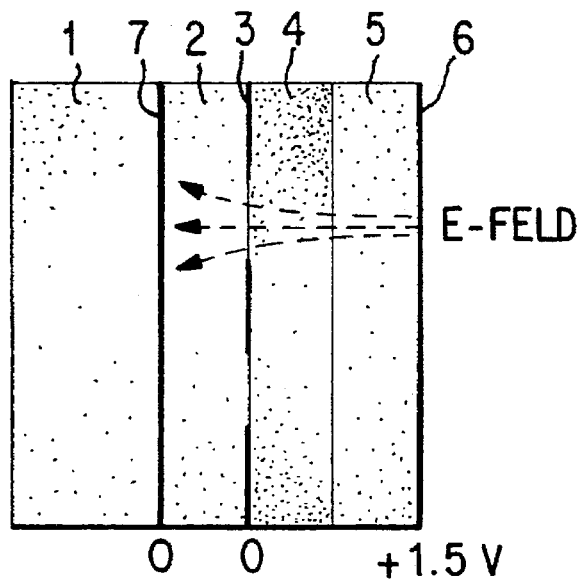
FIG. 4 is a representative side-view of the construction of a layer system with an additional IR-transparent electrode.
Figure 5:
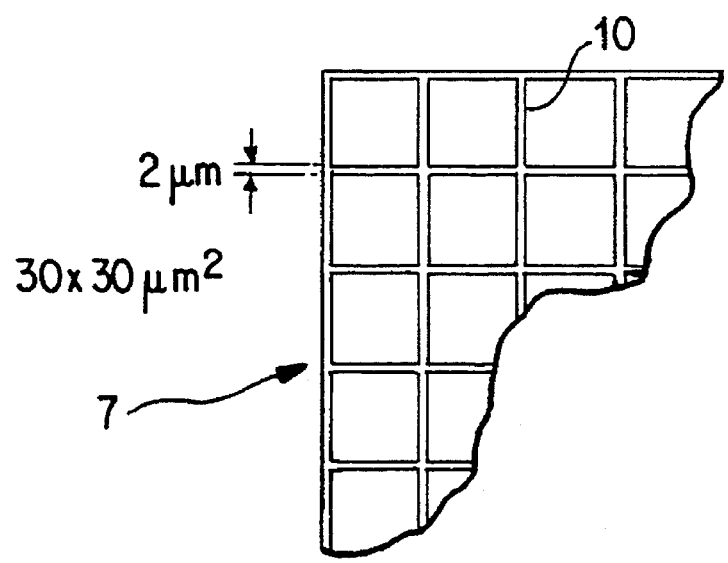
FIG. 5 is a view of an embodiment of the additional IR-transparent electrode of FIG. 4.

Such a layer system is illustrated in FIG. 4 wherein identical reference numbers in FIG. 4 and FIG. 1 correspond to the same elements. At the lower edge of the representation, the electric potential of the participating electrodes is entered. The electrode 7, in the following also called front electrode, between the carrier substrate 1 and the electroemissive layer 2 has the purpose of promoting the movement of the ions (for example, $Li^+$-ions) from the solid electrolyte into the electroemissive layer 2. Electrically, it is held on the same potential as the ion-permeable, IR-reflecting electrode 3 in order to thus cause, through the openings of the electrode 3, a penetration of the electric field so that, along these field lines, the $Li^+$-ions are injected into or withdrawn from the electroemissive layer 2. Since the front electrode 7 must be IR-transparent, it is provided with openings. It is advantageously constructed as a wide-meshed grid. Such a grid-shaped construction of the front electrode is illustrated in FIG. 5. In this case, the grid is constructed of strips 10 having a width of, for example, 2 μm. In this case, the distance between the strips in this example amounts to 30 μm. These thin strips 10, which are situated far away from one another, form a structure which is virtually transparent for an IR-radiation with a wavelength of 10 μm.

Like the ion-permeable, ion-reflecting electrode 3, the front electrode 7 is constructed of a stack of layers made of Ti/Au/Ti (thickness 10/120/20 nm) and is structured according to the same process.

Preferred materials for the individual layers of the layer system according to the invention with a controllable heat emission are, for example,:

Substrate 1: Silicium Si, germanium Ge, zinc sulfide ZnS, zinc selenide ZnSe, barium fluoride BaF, calcium fluoride CaF, polyethylene PE, polypropylene PP, polytetrafluor ethylene PTFE.

Solid Electrolyte 4: Lithium niobate $LiNb_2O_3$, lithium tantalate $LiTa_2O_3$, lithium borate $LiB_2O_3$.

Ion Storage Layer 5: Tungsten oxide $WO_3$, manganese oxide $MnO_2$, graphite C, polyaniline, nickel oxide $Ni_2O_3$, iridium oxide $IrO_2$, molybdenum oxide $MoO_3$, indium tin oxide $In_2O_3/SnO_2$.

Electroemissive Layer 2: polyaniline, nickel oxide $Ni_2O_3$, iridium oxide $IrO_2$, molybdenum oxide $MoO_3$, indium tin oxide $In_2O_3/SnO_2$.

Back Electrode, Front Electrode 3, 7: Materials are particularly suitable for this purpose which were mentioned for the ion-permeable, IR-reflecting electrode.

The application of the invention is not limited to the elements for the thermal control of spacecraft but is also suitable as a component: in elements for the infrared camouflaging of military equipment, of a picture element of infrared displays, in elements for producing infrared signatures for the invisible and temporary identification of objects, and in elements for controlling thermal radiation flows.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A layer system having a controllable heat emission, the layer system comprising:

an infrared (IR)-transparent carrier substrate;

a controllable IR-transmission layer arranged on said carrier substrate;

an ion-permeable, IR-reflecting electrode layer arranged on said controllable IR-transmission layer;

a solid electrolyte layer arranged on said reflecting electrode layer;

an ion storage layer arranged on said solid electrolyte layer;

a back electrode layer arranged on said ion storage layer; and wherein said ion-permeable, IR-reflecting electrode layer has non-cohesive openings distributed homogeneously over a surface of said IR-reflecting electrode layer, wherein a maximal flat dimension of said non-cohesive openings is less than 10 μm.

2. A layer system according to claim 1, wherein mutual distances between said openings are constant.

3. A layer system according to claim 1, wherein said ion-permeable, IR-reflecting electrode layer comprises a conductive material which is reflecting for infrared light of a wavelength longer than 2.5 μm.

4. A layer system according to claim 1, wherein said ion-permeable, IR-reflecting electrode layer is selected from the group consisting of Au, Ag, Pt, Pd, Al Cu, Fe, Pb, Ni, Cr, or mixtures thereof, and doped Si, Ge as well as indium oxide, tin oxide, zinc oxide, or mixtures thereof.

5. A layer system according to claim 1, wherein a surface area of said openings of the ion-permeable, IR-reflecting electrode layer amounts to at least 5% of the surface area of said reflecting electrode layer.

6. A layer system according to claim 1, wherein said openings are arranged on said ion-permeable, IR-reflecting electrode layer such that said reflecting electrode layer is electronically conductive over the whole electrode surface.

7. A layer system according to claim 1, wherein said openings of the ion-permeable IR-reflecting electrode layer are filled with an ion-conductive material.

8. A layer system according to claim 1, wherein a layer thickness of said ion-permeable, IR-reflecting electrode layer is larger than 0.1 μm and smaller than 1 μm.

9. A layer system according to claim 1, further comprising:

an IR-transparent electrode layer arranged between said IR-transparent carrier substrate and said controllable IR-transmission layer.

10. A layer system according to claim 9, wherein said IR-transparent electrode layer has openings.

11. A layer system according to claim 10, wherein a minimal plane dimension of said openings in said IR-transparent layer is in the range of between 20 and 100 μm.

* * * * *